US007011345B2

(12) United States Patent
Foos (10) Patent No.: US 7,011,345 B2
(45) Date of Patent: Mar. 14, 2006

(54) PIPE JOINT AND COUPLERS (75) Inventor: George J. Foos, Grand Rapids, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 1 day.

(21) Appl. No.: 10/672,543

(22) Filed: Sep. 26, 2003

(65) Prior Publication Data
US 2004/0119285 A1    Jun. 24, 2004

Related U.S. Application Data (60) Provisional application No. 60/414,551, filed on Sep. 27, 2002.

(51) Int. Cl.
*F16L 17/00* (2006.01)
(52) U.S. Cl. ............... 285/374; 285/921; 285/237; 285/224; 285/231
(58) Field of Classification Search ............. 285/374, 285/399, 921, 286.1, 288.6, 317, 239, 237, 285/224, 231
See application file for complete search history.

(56) References Cited

U.S. PATENT DOCUMENTS

| RE9,737 E | 5/1881 | Whittemore | |
|---|---|---|---|
| 249,594 A | 11/1881 | Dietz | |
| 883,941 A | * 4/1908 | Eagan | 285/276 |
| 1,324,602 A | 12/1919 | Lorenz | |
| 1,540,504 A | 6/1925 | Seaman | |
| 2,182,995 A | 12/1939 | Pepper et al. | |
| 2,252,240 A | 8/1941 | Tschappal | |
| 2,329,490 A | 9/1943 | Smith | |
| 2,366,067 A | 12/1944 | Smith | |
| 2,366,814 A | 1/1945 | Smith | |
| 2,525,799 A | 10/1950 | Hocker | |
| 2,774,617 A | 12/1956 | Lanninger | |
| 2,806,717 A | 9/1957 | Hempel | |
| 2,926,701 A | 3/1960 | Campbell | |
| 2,998,269 A | 8/1961 | Houghton | |

(Continued)

FOREIGN PATENT DOCUMENTS

| CA | 1164816 | 4/1984 |
|---|---|---|

(Continued)

OTHER PUBLICATIONS

"Sewer Renewal by Insertion with Nipak Polyethylene Pipe," May 9, 1973, 4 pgs.

(Continued)

*Primary Examiner*—David Bochna
(74) *Attorney, Agent, or Firm*—Jones Day (57) ABSTRACT

A pipe joint between cylindrical male and female couplers having terminal end portions with cooperating cam surfaces that facilitate assembly of the couplers. Cooperating projections on the couplers cam past one another when the couplers are assembled and restrain the couplers against separation. A gasket is interposed between the couplers, and the couplers are articulatable at least several degrees to permit some curvature to a string of pipe. The couplers have splines received in annular sockets in the ends of pipes, and the sockets are filled with adhesive to retain the splines therein. The gasket is prelubricated and protected by a plastic wrap that also provides protection against ultraviolet rays. Cylindrical ring couplers are formed by extruding a strip having a coupler cross-sectional profile, cutting a length of the strip and fusing the ends at a joint. The joint is deburred and polished, and the ring is heated and placed on a mandrel where the ring cools to relieve stress in the plastic and provide the final cylindrical configuration.

23 Claims, 7 Drawing Sheets

U.S. PATENT DOCUMENTS

| | | | |
|---|---|---|---|
| 3,018,785 | A | 1/1962 | Adams, Jr. et al. |
| 3,020,054 | A | 2/1962 | Driancourt |
| 3,315,971 | A | 4/1967 | Sakurada |
| 3,340,890 | A | 9/1967 | Raskhodoff |
| 3,390,890 | A | 7/1968 | Kurtz |
| 3,479,067 | A | 11/1969 | Potts |
| 3,508,771 | A | 4/1970 | Duret |
| 3,520,047 | A | 7/1970 | MOhlner et al. |
| 3,645,547 | A | 2/1972 | Glover |
| 3,666,297 | A | 5/1972 | Marks |
| 3,698,744 | A | 10/1972 | Bevington |
| 3,784,235 | A | 1/1974 | Kessler et al. |
| 3,809,412 | A | 5/1974 | Glover |
| 3,858,912 | A | 1/1975 | Bower |
| 3,926,223 | A | 12/1975 | Petzetakis |
| 4,030,850 | A | 6/1977 | Hyde |
| 4,097,074 | A | 6/1978 | Nagao et al. |
| 4,126,337 | A | 11/1978 | Nagao et al. |
| 4,182,519 | A | 1/1980 | Wilson |
| 4,223,895 | A | 9/1980 | Roberts, Jr. et al. |
| 4,274,663 | A | 6/1981 | Becker et al. |
| 4,293,149 | A | 10/1981 | Bonel |
| 4,343,480 | A | 8/1982 | Vassallo |
| 4,361,349 | A | 11/1982 | Wolf et al. |
| 4,400,019 | A | 8/1983 | Fruck |
| 4,549,337 | A * | 10/1985 | Newell et al. ............. 29/527.4 |
| 4,565,381 | A | 1/1986 | Joelson |
| 4,690,414 | A | 9/1987 | Haaland |
| 4,702,502 | A | 10/1987 | Shade et al. |
| 4,757,595 | A | 7/1988 | Fraering, Jr. |
| 4,758,024 | A | 7/1988 | Kaempen |
| 4,768,278 | A | 9/1988 | Pickering et al. |
| 4,779,902 | A | 10/1988 | Lee |
| 4,796,669 | A | 1/1989 | St. Onge |
| 4,807,910 | A | 2/1989 | Johansson et al. |
| 4,819,972 | A | 4/1989 | Champa et al. |
| 4,856,561 | A | 8/1989 | Zicaro |
| 4,865,357 | A | 9/1989 | Brinegar |
| 4,875,714 | A | 10/1989 | Lee |
| 4,906,010 | A | 3/1990 | Pickering et al. |
| 4,958,959 | A | 9/1990 | St. Onge |
| 5,015,014 | A | 5/1991 | Sweeney |
| 5,022,941 | A | 6/1991 | Doheny, Jr. et al. |
| 5,052,725 | A * | 10/1991 | Meyer et al. ............... 285/308 |
| 5,053,097 | A | 10/1991 | Johansson et al. |
| 5,078,430 | A | 1/1992 | St. Onge |
| 5,096,528 | A | 3/1992 | Durrenberger et al. |
| 5,145,283 | A * | 9/1992 | Gowen ...................... 405/157 |
| 5,158,815 | A | 10/1992 | Doheny, Jr. et al. |
| 5,213,339 | A | 5/1993 | Walworth |
| 5,236,231 | A | 8/1993 | Allen et al. |
| 5,240,293 | A | 8/1993 | Allen et al. |
| 5,255,945 | A | 10/1993 | Toon |
| 5,360,240 | A | 11/1994 | Mott |
| 5,362,112 | A | 11/1994 | Hamilton et al. |
| 5,383,693 | A | 1/1995 | Shade |
| 5,417,442 | A | 5/1995 | Jörnhagen |
| 5,469,891 | A | 11/1995 | Lund et al. |
| 5,547,230 | A | 8/1996 | Bank et al. |
| 5,601,776 | A | 2/1997 | Tuominen |
| 5,609,368 | A * | 3/1997 | Maki et al. ................. 285/231 |
| 5,624,139 | A * | 4/1997 | Van Kooten ................ 285/31 |
| 5,636,875 | A | 6/1997 | Wasser |
| 5,653,452 | A | 8/1997 | Järvenkylä |
| 5,653,475 | A * | 8/1997 | Scheyhing et al. ........... 285/54 |
| 5,662,360 | A | 9/1997 | Guzowski |
| 5,687,997 | A | 11/1997 | Beacom |
| 5,703,154 | A | 12/1997 | Davis et al. |
| 5,707,088 | A | 1/1998 | Miller et al. |
| 5,709,411 | A | 1/1998 | Bank et al. |
| 5,730,474 | A | 3/1998 | Bank |
| 5,775,741 | A | 7/1998 | Rice et al. |
| 5,794,662 | A | 8/1998 | St. Onge et al. |
| 5,797,627 | A * | 8/1998 | Salter et al. ................. 285/38 |
| 5,820,720 | A | 10/1998 | Campbell |
| 5,836,621 | A | 11/1998 | Campbell |
| 5,842,727 | A | 12/1998 | Shade |
| 5,862,581 | A | 1/1999 | Miller et al. |
| 5,921,591 | A | 7/1999 | Argent |
| 5,934,709 | A | 8/1999 | Morrison |
| 5,944,323 | A | 8/1999 | Cavka |
| 5,951,058 | A | 9/1999 | Dickinson et al. |
| 6,016,849 | A | 1/2000 | Harget et al. |
| 6,105,972 | A | 8/2000 | Guzowski |
| 6,113,158 | A | 9/2000 | Bocchicchio et al. |
| 6,113,159 | A | 9/2000 | Corbett, Jr. |
| 6,131,954 | A | 10/2000 | Campbell |
| 6,149,756 | A | 11/2000 | Jarvenkyla |
| 6,152,494 | A | 11/2000 | Corbett, Sr. et al. |
| 6,152,495 | A * | 11/2000 | Hoffmann et al. ..... 285/148.19 |
| 6,176,523 | B1 | 1/2001 | Winslett |
| 6,231,086 | B1 | 5/2001 | Tierling |
| 6,237,964 | B1 | 5/2001 | Østergaard |
| 6,258,197 | B1 | 7/2001 | Helander |
| 6,299,176 | B1 | 10/2001 | Guzowski et al. |
| 6,302,983 | B1 | 10/2001 | Agren et al. |
| 2001/0048223 | A1 | 12/2001 | Campbell |

FOREIGN PATENT DOCUMENTS

| | | | |
|---|---|---|---|
| DE | 4305609 | * 11/1993 | ................. 285/239 |
| JP | 53116733 | 10/1978 | |
| JP | 5124321 | 5/1993 | |

OTHER PUBLICATIONS

St. Onge, H.S., "Updating aging sewers without trenching," Environment and Contract Record, Jul. 1974, 4 pgs.

* cited by examiner

PIPE JOINT AND COUPLERS

RELATED APPLICATIONS

This application claims subject matter disclosed in U.S. provisional application Ser. No. 60/414,551 filed Sep. 27, 2002, the benefit of the filing date of which is hereby claimed.

BACKGROUND OF THE INVENTION

This application relates to the art of relining sewers and, more particularly, to pipe joints and couplers that connect pipes used for relining sewers. Although the invention is particularly applicable to pipe used for relining sewers and will be described with specific reference thereto, it will be appreciated that the invention has broader aspects and can be used in other environments and for other purposes.

Sewers commonly are relined while water continues to flow through the existing sewer. Adjacent sections of new pipe must be joined together in cramped quarters in a trench where it is difficult to work, and where the pipe end portions are subject to being fouled by dirt. This makes it difficult to assemble a joint between adjacent pipe sections in an efficient and leak-tight manner. It would be desirable to have a pipe joining arrangement that is more efficient and less subject to leakage or contamination by dirt as compared with existing arrangements.

SUMMARY OF THE INVENTION

Adjacent sections of plastic pipe used for relining sewers are joined together by male and female coupler members. The couplers have cooperating cam surfaces that facilitate assembly of a joint by guiding a male coupler within a female coupler.

The male and female couplers have cooperating projections that cam past one another when the couplers are assembled and that restrain separation of the couplers once they are assembled.

The couplers have splines that are adhesively bonded within annular sockets on pipe end portions.

An elastomeric gasket bonded to the external surface of the male coupler sealingly engages an internal surface on the female coupler.

The male and female couplers are configured for providing angular movement therebetween up to at least several degrees so that a string of pipe can be curved while maintaining integrity of the joints.

The gasket is prelubricated and wrapped in a protective covering that also provides protection against ultraviolet rays.

The cylindrical couplers are made by forming an extruded length of plastic strip into a generally cylindrical configuration and bonding the end portions together.

The formed coupler ring then is heated and placed on a mandrel where it is allowed to cool for relieving stress therein and assuming its final generally cylindrical configuration.

It is a principal object of the present invention to provide an improved pipe joint between pipes used for relining sewers.

It is an additional object of the invention to provide improved coupler members used for joining adjacent pipe sections.

It is another object of the invention to provide an improved pipe joint that is capable of angular movement while maintaining integrity of the joint.

It is a further object of the invention to provide an improved gasketing arrangement for a pipe joint.

It is another object of the invention to provide a prelubricated gasket that is protected against contamination and ultraviolet rays.

It also is an object of the invention to provide an improved way of forming a generally cylindrical pipe coupler.

DESCRIPTION OF A PREFERRED EMBODIMENT

Figure 1:
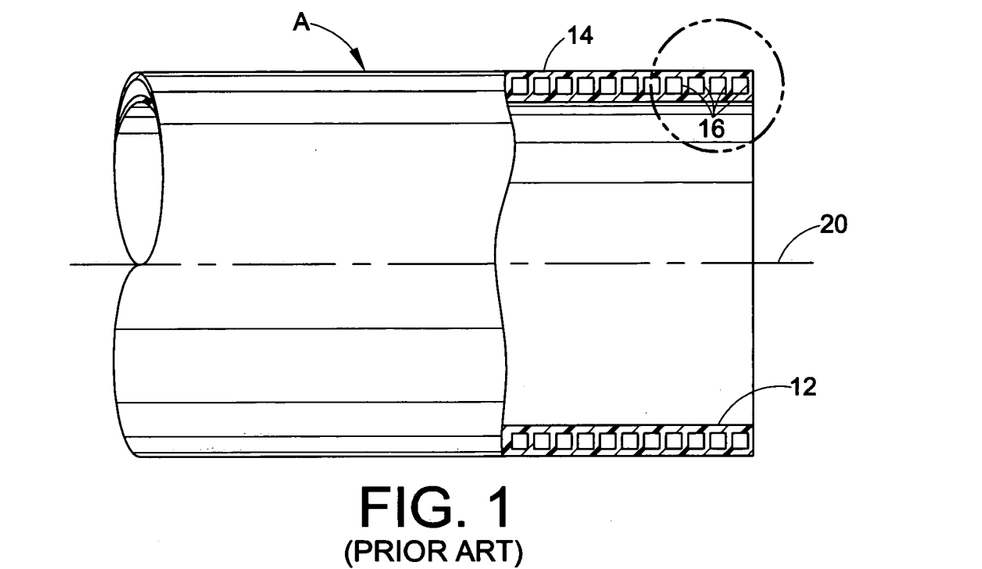
FIG. 1 is a side elevational view of a prior art type of pipe used with the joint and couplers of the present application, and with an end portion of the pipe in section for clarity of illustration.

Referring now to the drawing, wherein the showings are for purpose of illustrating a preferred embodiment of the invention only and not for purposes of limiting same, FIG. 1 shows a prior art pipe of the type disclosed in U.S. Pat. Nos. 3,926,223 and 5,096,529, the disclosures of which are hereby incorporated herein by reference. The pipe is made by helically coiling a hollow extrusion and bonding adjacent coils together to form a pipe having cylindrical inner and outer surfaces 12, 14. The pipe peripheral wall between inner and outer cylindrical surfaces 12, 14 thereof has a helical hollow passage therein, and generally radially extending longitudinally-spaced walls 16 separate adjacent hollow passage turns from one another.

Figure 2:
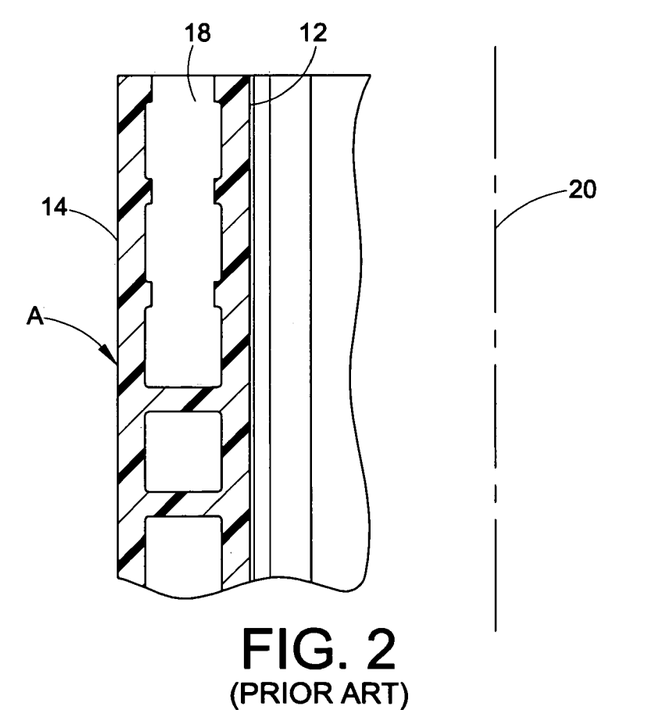
FIG. 2 is a partial cross-sectional elevational view of the circled area of FIG. 1, and with the pipe rotated to stand on end with its axis vertical.

FIG. 2 shows an end portion of pipe A with several of walls 16 routed out to provide an annular cavity or socket 18 within the pipe end portion. The showing in FIG. 2 is with the pipe standing on end and its longitudinal axis 20 extending vertically. Both of the opposite ends of the pipe are routed out to provide axially-extending annular sockets therein.

Figure 3:
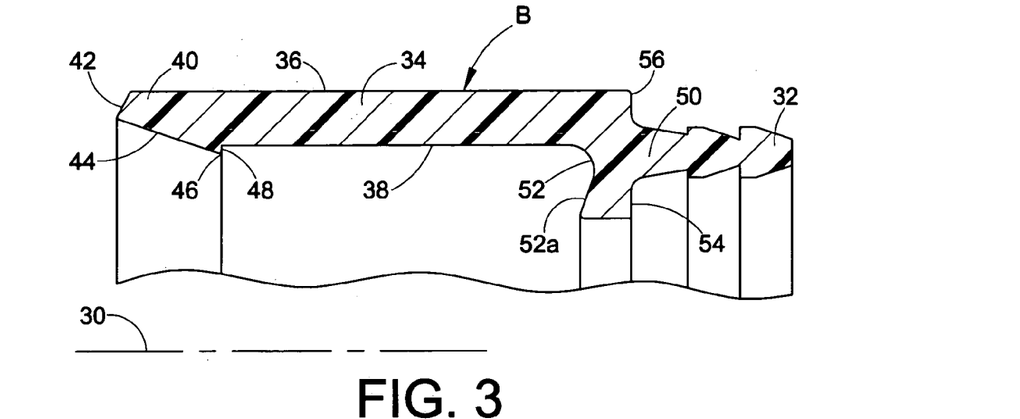
FIG. 3 is a partial cross-sectional elevational view of a female coupler in accordance with the present application.

FIG. 3 shows a generally cylindrical female coupler B having a longitudinal axis 30. Female coupler B has an annular barbed spline 32 extending generally parallel to axis 30. A female coupler portion 34 that extends generally parallel to axis 30 is displaced radially outwardly from annular barb portion 32, and has a smooth cylindrical outer surface 36 and a cylindrical inner surface 38. An end portion 40 of coupler portion 34 has a terminal end 42 opposite from barb portion 32. Terminal end 42 is inclined outwardly from cam surface 44 in a direction back toward spline end portion 50 at an angle of around 20° to a radial line from coupler axis 30. An annular cam surface 44 is inclined from terminal end 42 toward axis 30 in a direction back toward barbed portion 32. Cam surface 44 lies on the surface of a cone and is inclined at an angle of around 20° to cylindrical outer surface 36.

Inner cylindrical surface 38 of coupler portion 34 intersects cam surface 44 at a radially inwardly extending projection 46 to provide a shoulder 48 that extends generally radially of axis 30 and faces back toward barbed spline 32. Inner cylindrical surface 38 intersects barbed end portion 50 at smoothly curved concave internal shoulder 52 that merges with a straight surface 52a that is inclined at an included angle of around 20° with a radial line from the coupler axis. Shoulders 54 and 56 extend generally radially inwardly and outwardly from barbed end portion 50.

Figure 4:
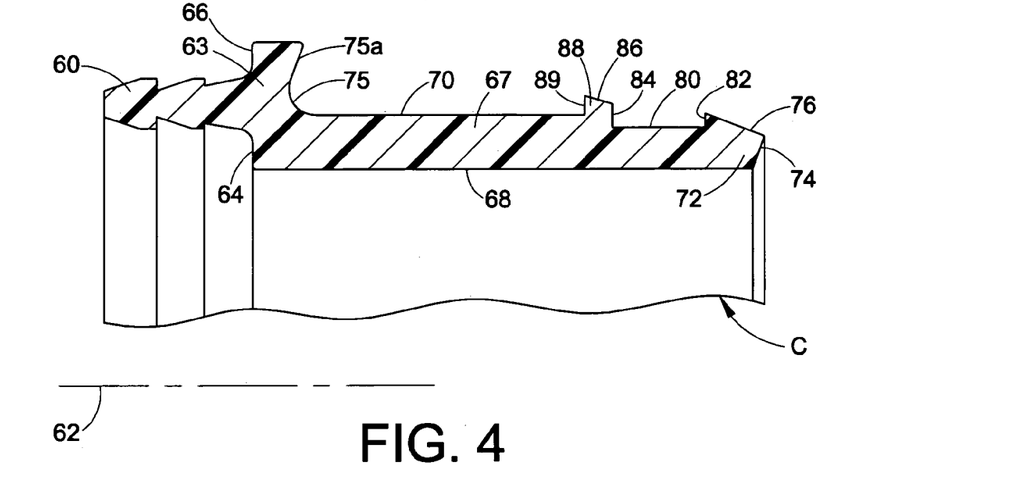
FIG. 4 is a partial cross-sectional elevational view of a male coupler in accordance with the present application.

FIG. 4 shows a male coupler C having an annular barbed spline 60 extending parallel to longitudinal axis 62 on a spline end portion 63 having shoulders 64, 66 extending generally radially inwardly and outwardly therefrom.

Male coupler C has a generally cylindrical coupler portion 67 extending in an opposite direction from barbed end portion 63 and displaced radially inwardly from barbed spline 60. Coupler portion 67 has a smooth cylindrical inner surface and a cylindrical outer surface 70. Coupler portion 67 has an end portion 72 opposite from barbed spline 60 and a terminal end 74 that is inclined inwardly from cam surface 76 at an angle of around 20° to a radial line from coupler axis 62. An inclined annular cam surface 76 extends from terminal end 74 in a direction away from longitudinal axis 62 and back toward barbed portion 60. Cam surface 76 lies on the surface of a cone and is inclined to cylindrical inner surface 68 at an included angle therewith of around 20°. Cylindrical outer surface 70 intersects a concavely curved annular portion 75 which in turn intersects a straight surface 75a that is inclined at an included angle of around 20° with a radial line from the coupler axis.

A generally rectangular outer circumferential groove or recess 80 is provided in coupler portion 67 adjacent end portion 72 thereof. Groove 80 intersects cam surface 76 at a radially outwardly extending projection that provides an annular shoulder 82 forming one radially extending sidewall of groove 80. The opposite side of groove 80 has a groove sidewall 84 intersecting an inclined cam surface 86 on a projection 88 that extends radially outwardly from coupler portion 67 to provide a radially extending shoulder 89 that faces toward spline end portion 63. Inclined surface 86 is inclined approximately parallel to cam surface 76.

Figure 5:
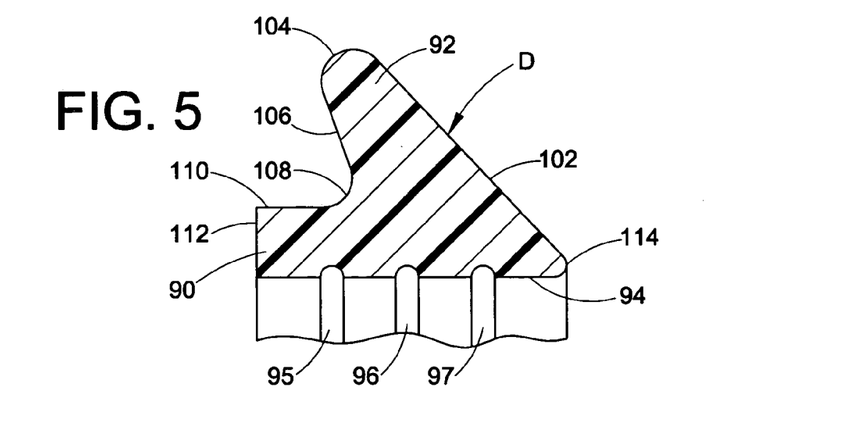
FIG. 5 is a partial cross-sectional elevational view of an elastomeric gasket used with the couplers of the present application.

FIG. 5 shows an annular gasket D of elastomeric material having a base portion 90 and a deformable lip portion 92. Cylindrical inner surface 94 of gasket D includes a plurality of axially-spaced circumferential recesses 95, 96 and 97. Leading inclined gasket surface 102 is inclined at an included angle with cylindrical inner surface 94 of around 50°. The terminal end of sealing lip 92 is smoothly curved at 104 and intersects with a backwardly inclined surface 106 that is inclined at an included angle to the horizontal of around 70°. Backwardly inclined surface 106 is smoothly curved outwardly as at 108 to merge with a generally flat cylindrical surface 110.

Within a joint, surface 102 is the gasket surface that is subjected to water pressure from inside of a pipe while rear surface 106 is possibly subjected to pressure from ground water and/or from grouting of the new pipe within the host pipe. Cylindrical inner surface 94 is glued to the bottom of groove 80 in FIG. 4, preferably with an adhesive that does not build gasket height such as a cyanoacrylate. Recesses 95–97 provide glue channels to enhance bonding of the gasket to the male coupler.

Rear end 112 of gasket D extends generally parallel to radial sidewall 84 of groove 80 and helps to restrain the gasket against movement during installation of a male coupler within a female coupler so that excessive stress is not applied to the adhesive joint between the gasket and the male coupler. Front inclined surface 102 intersects flat cylindrical inner surface 94 at a generally sharp but curved intersection 114.

Gasket D is spaced from end 74 and cam surface 76 so it is protected from damage when joints are made. If the coupler ends collide while being aligned to make a joint, the gasket is out of harms way and protected against damage.

Couplers B and C are attached to a pipe A by routing out an annular cavity to provide an annular socket as described with reference to FIG. 2. When pipe walls 16 are routed away to form annular sockets 18 in the pipe end portions, there is an opening into the hollow helical passage within the pipe wall. This opening is plugged with backer rod or in any other suitable manner such as with a foam plastic plug. Hot melt adhesive or a two-part epoxy then is placed within annular socket 18 with pipe A standing vertically.

A spline portion 32 or 60 of a coupler then is plunged into the unsolidified adhesive within socket 18 until shoulders 54, 56 or 64, 66 abut the outer end of the pipe adjacent socket 18. Hot melt adhesive at least partly melts and burns into the plastic of pipe A and of a coupler to fuse therewith and firmly bond a coupler to a pipe when the adhesive solidifies or cures. Each pipe has a male coupler attached to one end portion thereof and a female coupler attached to the opposite end portion thereof.

The amount of adhesive placed in a socket is calculated so that the adhesive fills the socket cavity when a spline is plunged into it. Hot melt adhesive forms both a thermal bond and a mechanical interlock to resist forces in all directions. The adhesive also creates a vacuum tight and pressure tight seal between the coupler and pipe. The annular pipe sockets are routed out ten to fifteen percent deeper than the axial length of a spline to allow movement of adhesive from one side to the other before curing.

Figure 6:
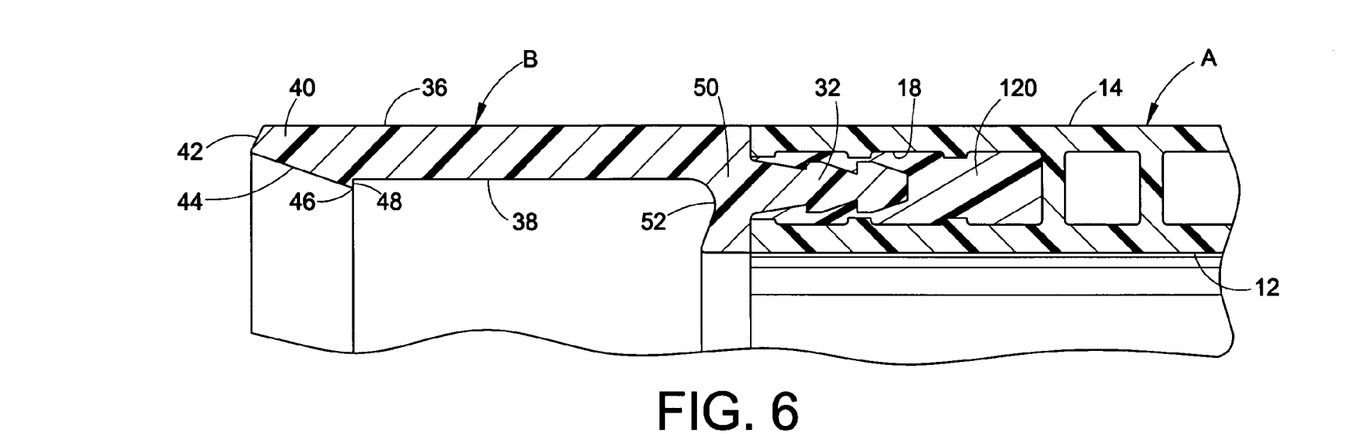
FIG. 6 is a partial cross-sectional elevational view showing the female coupler of FIG. 3 connected to an end portion of the pipe of FIG. 1.
Figure 7:
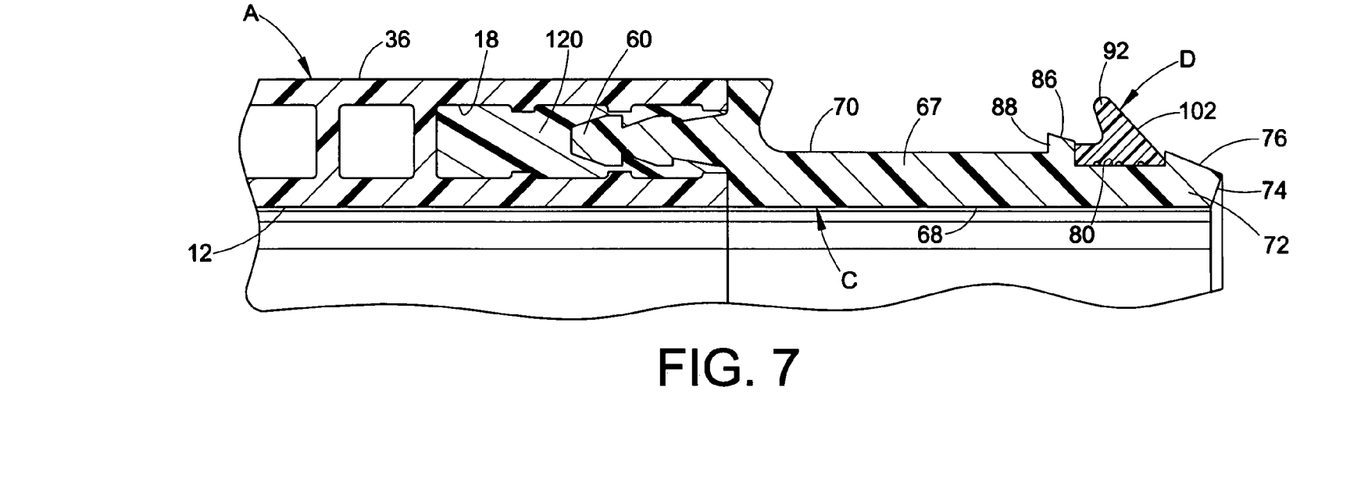
FIG. 7 is a partial cross-sectional elevational view showing the male coupler of FIG. 4 joined to an end portion of the pipe of FIG. 1, and with the elastomeric gasket of FIG. 5 installed on the male coupler.

Pipe having male and female couplers attached thereto is shown in FIGS. 6 and 7. The solidified hot melt adhesive or epoxy adhesive is generally indicated by number 120 in FIGS. 6 and 7. As shown in FIGS. 6 and 7, outer cylindrical surface 36 of female coupler B is substantially flush with cylindrical outer surface 14 of pipe A. Likewise, inner cylindrical surface 68 on male coupler C is substantially flush with inner cylindrical surface 12 of pipe A.

In the preferred arrangement, the diameter of outer cylindrical surface 36 on female coupler B is not larger than the diameter of pipe outer cylindrical surface 14, and the diameter of male coupler inner cylindrical surface 68 is not smaller than the diameter of pipe inner cylindrical surface 12. Thus, the coupling arrangement does not provide any external enlargement between adjacent pipe sections and does not reduce the internal size of the pipe internal passage.

Axial forces applied for pushing long strings of pipe are maintained generally axially of the pipes by elongated splines 32 and 60 so that the inner or outer pipe walls do not break or telescope.

Radial shoulders 54, 56 and 64, 66 firmly engage the pipe ends to transfer column loads between the pipe and couplers. The entire spline end portions 50, 63 define strong bulkheads on the couplers to withstand large forces and to transfer such forces. Inclined surfaces 52a, 75a are engaged by cooperatively inclined coupler ends 74, 42 to prevent the couplers from telescoping past one another when high column loads are applied to a pipe string. The higher the load, the tighter the engagement between female coupler end 42 and male coupler surface 75a, and between male coupler end 74 and female coupler surface 52a.

Figure 8:
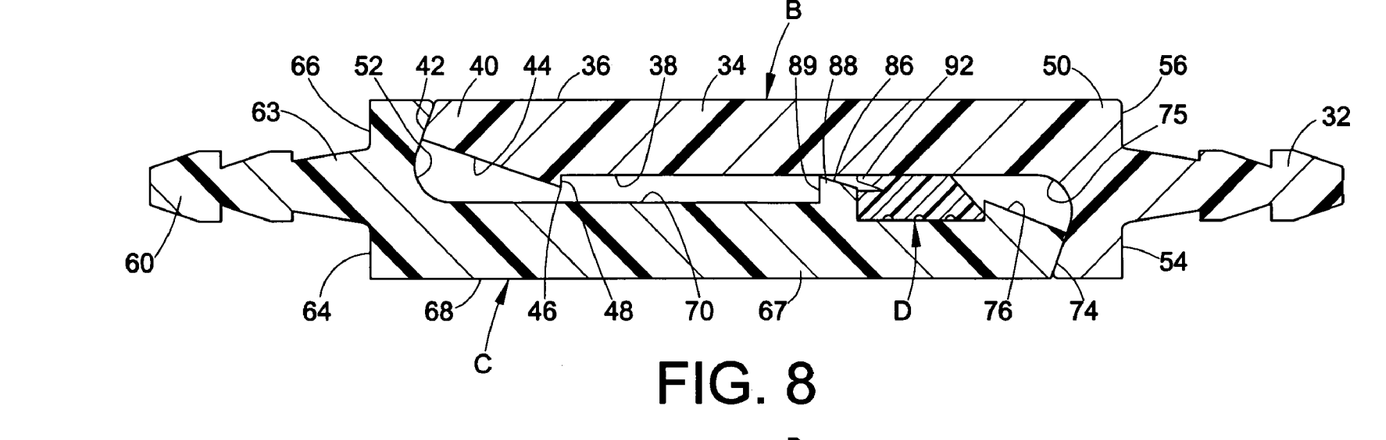
FIG. 8 is a partial cross-sectional elevational view showing the male and female couplers joined together.

FIG. 8 shows female and male couplers B, C joined together with gasket D deformed to the configuration shown in FIG. 8 by engagement with internal cylindrical surface 38 on female coupler B. Sealing lip 92 on gasket D is deformed to a generally horizontal configuration.

Figure 11:
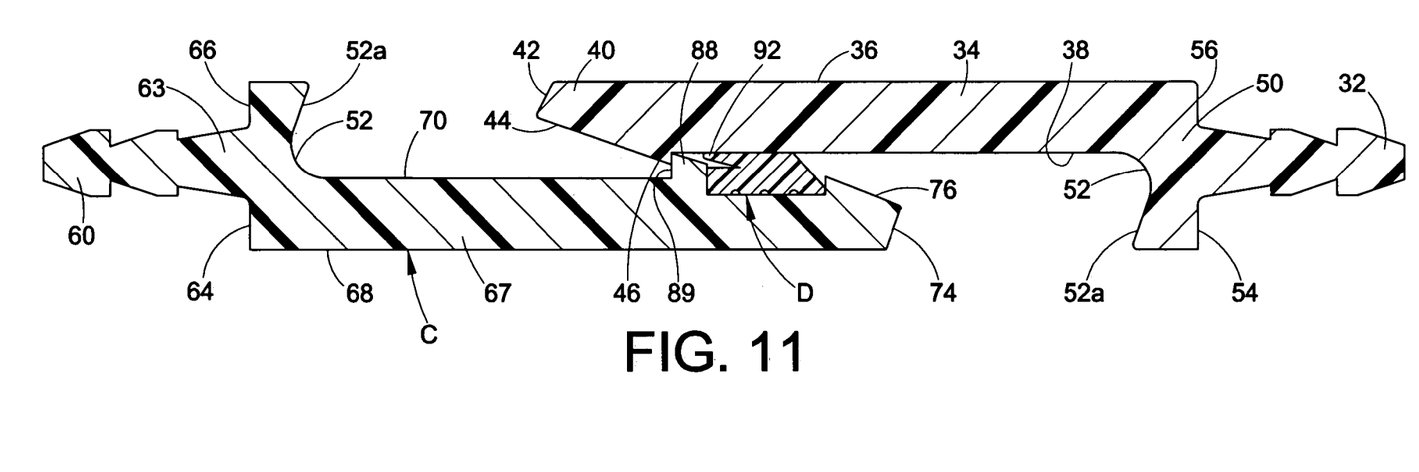
FIG. 11 is a partial cross-sectional elevational view showing the male and female couplers with cooperating projections that restrain separation of the joined couplers.

Annular cam surfaces 44 and 76 on female and male couplers B, C cooperatively engage one another to facilitate assembly of the couplers to the position shown in FIG. 8. Projections 46 and 88 on female and male couplers B, C have an interference fit with one another so that some force is required to move the projections past one another in assembling the joint. Cooperation of projections 46 and 88 then restrains the couplers against longitudinal separation as shown in FIG. 11. When pipe initially is installed, pipe sections may float downstream and cooperation between projections 46, 88 holds the joints together as indicated in FIG. 11. However, a joint can be manually separated by angularly articulating a joint and/or using additional separating force.

After a string of pipes have been joined together in relining a host pipe, axial force is applied to the pipe string for collapsing all the joints to the general position shown in FIG. 8. The radial space between the exterior of the new pipe and the interior of the host pipe then is filled with grout that is injected under pressure. The grout normally will enter the space between coupler inner surfaces 38, 70 through a clearance opening between terminal end 42 on female coupler portion 34 and surfaces 52, 52a on male coupler C.

Figure 9:
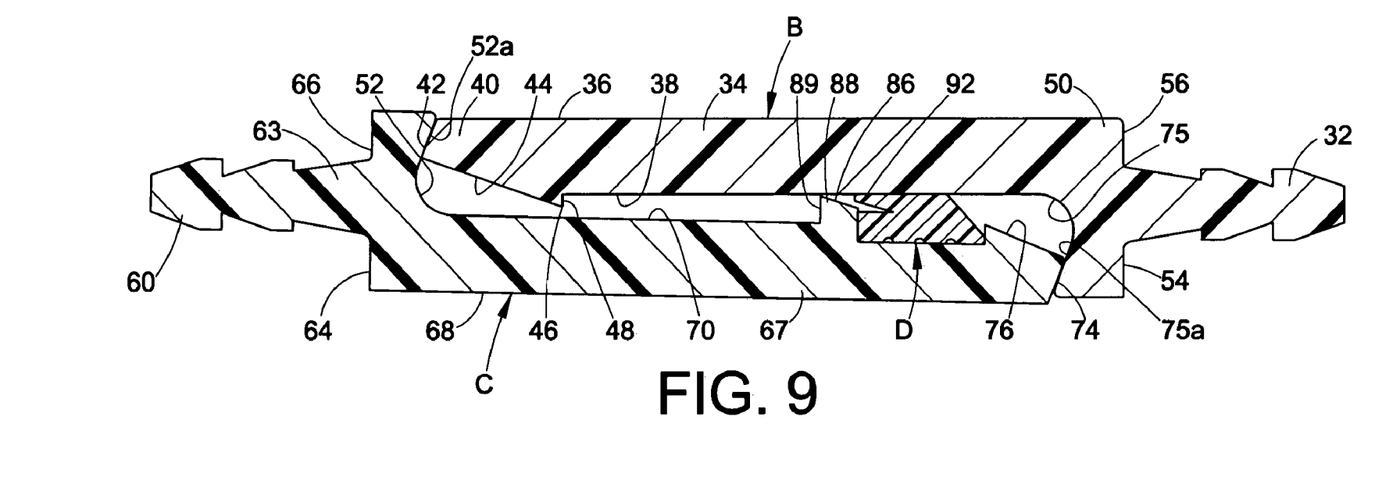
FIGS. 9 and 10 are partial cross-sectional elevational views showing different angular positions of the male and female couplers relative to one another.
Figure 10:
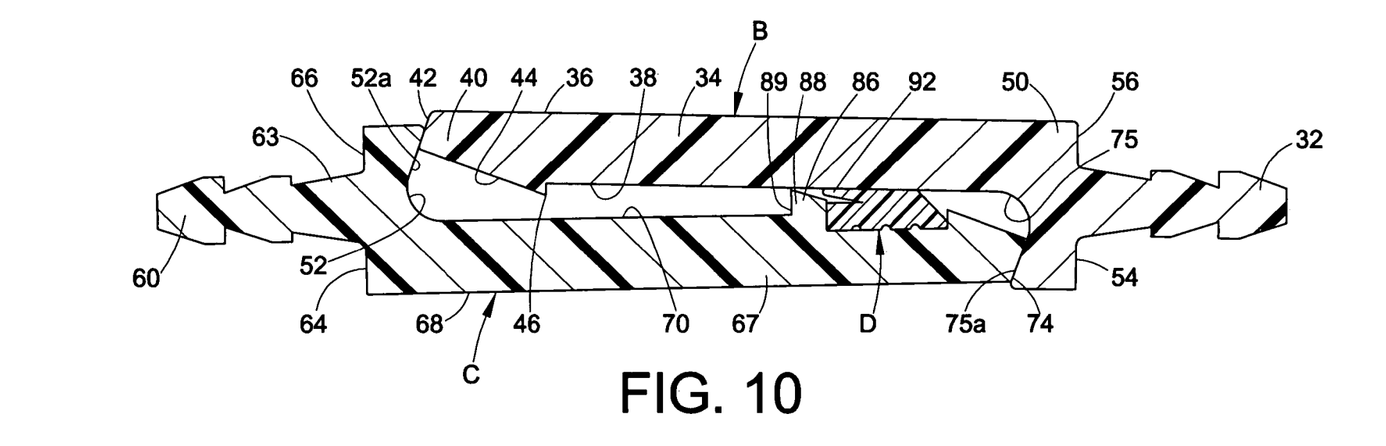

The joint of the present application is articulatable as shown in FIGS. 9 and 10 so that the axes of adjacent pipe sections can be skewed relative to one another up to several degrees. This permits imparting curvature to a pipe string while maintaining the integrity of the joints.

Figure 12:
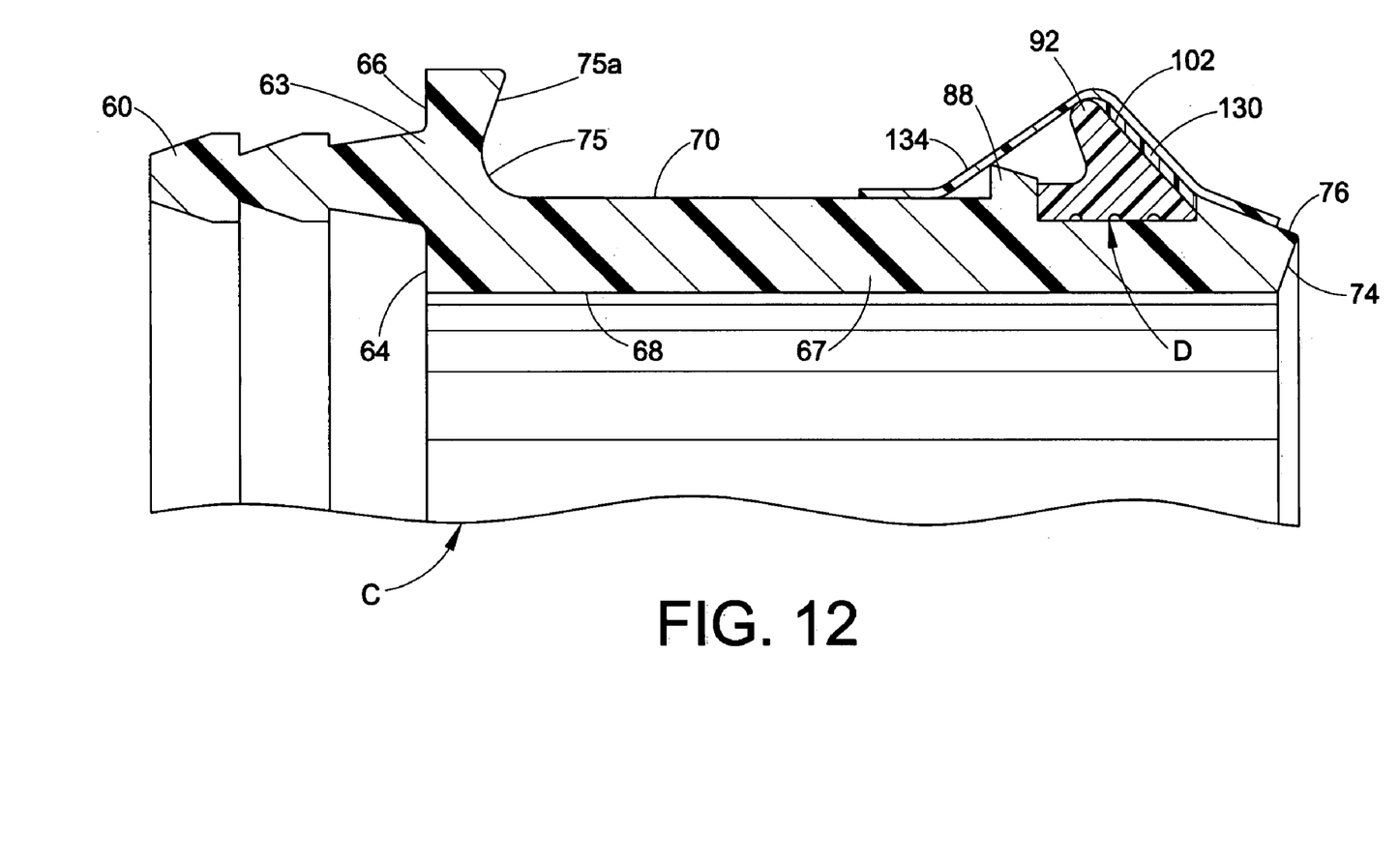
FIG. 12 is a partial cross-sectional elevational view showing the male coupler with a lubricant coating the gasket, and with a plastic wrap over the gasket to protect same against contamination and against ultraviolet rays.

FIG. 12 shows a lubricant such as a silicone lubricant 130 applied to inclined leading surface 102 on gasket D. A plastic stretch film 134 that contains ultraviolet ray inhibitors is tightly wrapped around the end portion of male coupler C over gasket D and the coupler end portion. This protects the gasket and the lubricant during storage of pipe in a storage yard, and during handling preparatory for installation within a trench. Just prior to making a joint, a worker can tear off stretch wrap 134 to expose a clean and prelubricated gasket for reception within the female coupler.

Figure 13:
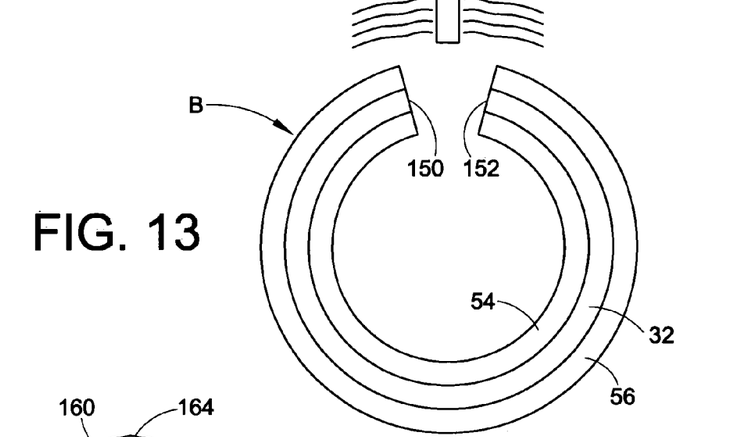
FIG. 13 is an end elevational view showing a strip of extruded coupler material formed into a generally cylindrical configuration for joining the ends thereof together.
Figures 14, 15:
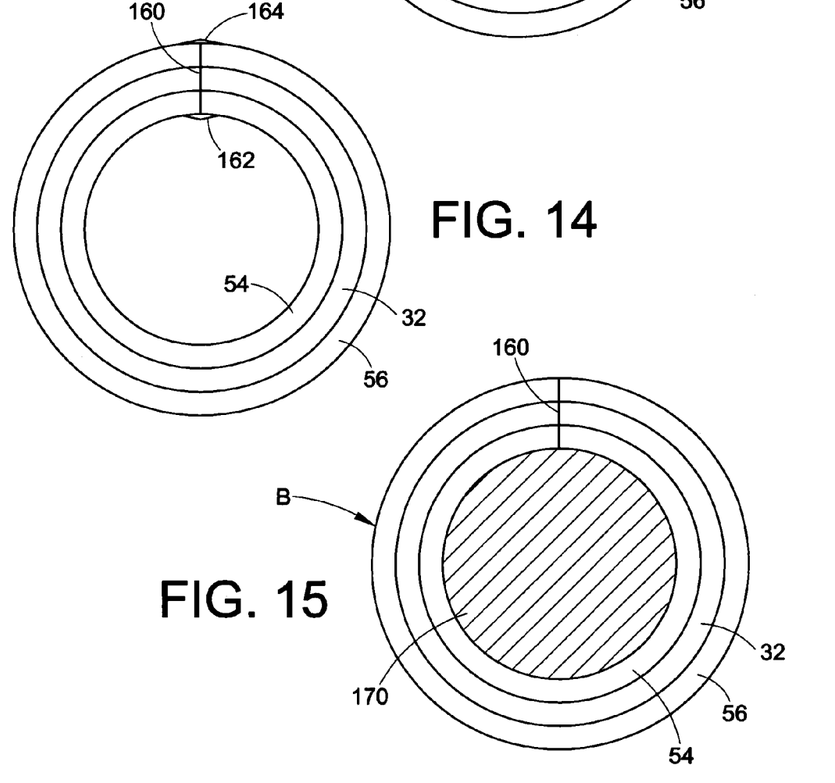
FIG. 14 is a view similar to FIG. 13 showing the ends of the coupler strip joined together with bulges or burrs at the joint.
FIG. 15 is a view showing the coupler strip of FIG. 14 after deburring and polishing, and being positioned on a cylindrical mandrel.

The couplers are extruded to the cross-sectional shape described as an elongated strip. Appropriate lengths of strip then are cut and bent into a generally cylindrical shape as shown in FIG. 13. Ends 150, 152 then are heated by suitable heating device 154 to near the melting point thereof. Softened ends 150, 152 then are butted together and pressure welded so that the plastic material fuses into a joint as generally indicated at 160 in FIG. 14.

Internal and external longitudinal bulges 162, 164 usually will be formed at the joint. These bulges are removed by deburring and polishing equipment to provide smooth cylindrical surfaces. The entire ring then is heated and placed on an appropriately shaped cylindrical mandrel 170 in FIG. 15. The ring that forms coupler B then is allowed to cool for relieving stress therein, to provide a relatively rigid finished cylindrical coupler of suitable rigid plastic material such as polyvinylcholoride that also is know as PVC. Coupler C is formed in the same manner.

The coupling arrangement of the present application provides a lap type of joint and there is nowhere for water to be trapped within the joint so that the joint is easily slammed together once the male coupler has been started into the female coupler.

Installation of liner pipe into a host pipe with live flow is difficult because the pipe is pushed around, and bobs up and down in the flow. When a host pipe is running up to around 50% full of water, it is not possible to see the bottom half of the pipes being coupled. In the arrangement of this application having cam surfaces 44, 76, up to around 60% of the pipe wall thickness between inner and outer surfaces 12, 14 is effectively open to funnel the male coupler within the female coupler. The high strength rigid PVC used for the couplers minimizes the possibility of damage to the coupler ends.

Field assembly of custom pipe lengths can be done by cutting a pipe to a desired length and routing out the ends. The pipe may have male or female couplers attached to both ends, or may have a female coupler attached to one end and a male coupler attached to the opposite end. Two part epoxy is more convenient for securing coupler splines within the routed sockets in the field.

Although the invention has been shown and described with reference to a representative embodiment, it is obvious that alterations and modifications will occur to others skilled in the art upon the reading and understanding of this application. Therefore, it is to be understood that the invention may be practiced otherwise than as specifically described herein while remaining within the scope of the claims.

I claim:

1. A cylindrical female pipe coupler B having a longitudinal axis 30, said coupler having a spline portion 32 and a female coupling portion 34 extending in opposite directions generally parallel to said axis 30, said spline portion 32 being attachable to a pipe A, said female coupling portion 34 having inner and outer surfaces 36, 38 and a terminal end 42, a sloping cam surface 44 extending from said terminal end 42 in a direction toward said longitudinal axis 30 and back toward said spline portion 32, said cam surface 44 terminating at an intersection 46 with a shoulder 48 that extends from said inner surface 38 of said female coupling portion 34 toward said longitudinal axis 30 so that said intersection 46 is spaced toward said longitudinal axis 30 from said inner surface 38 and is spaced toward said spline portion from said terminal end 42 of said female coupling portion 34.

2. The coupler of claim 1 wherein said female coupling portion is displaced radially outwardly of said longitudinal axis from said spline portion, said spline portion having barbed inner and outer surfaces, and said spline portion providing no part of any fluid flow passage through said coupler.

3. The coupler of claim 2 wherein said female coupling portion has a cylindrical inner surface 38 and further including a transition portion 54 between said spline portion 32 and said female coupling portion 34, said transition portion 54 extending toward said longitudinal axis 30 from said cylindrical inner surface 38 and having a concave curved inner surface 52, 52*a* facing in a direction toward said shoulder 48.

4. A cylindrical male pipe coupler having a longitudinal axis, said coupler having a spline portion and a male coupling portion extending generally parallel to said longitudinal axis, said male coupling portion having inner and outer surfaces and a terminal end, said outer surface including a circumferential groove spaced axially from said terminal end and having opposite inner and outer groove sidewalls, a sloping cam surface extending from said terminal end in a direction away from said longitudinal axis and back toward said spline portion to a first intersection with said outer groove sidewall, said outer surface including an outwardly extending circumferential projection adjacent said inner groove sidewall, said projection having a projection outer surface that slopes from said inner groove sidewall in a direction away from said longitudinal axis and back toward said spline portion to a second intersection with a projection inner sidewall, and said second intersection being spaced outwardly from said longitudinal axis farther than said first intersection.

5. The coupler of claim 4 wherein said male coupling portion is displaced inwardly toward said longitudinal axis from said spline portion.

6. The coupler of claim 4 including a transition portion between said spline portion and said male coupling portion, said transition portion having a concave curved surface adjacent said outer surface of said male coupling portion that faces toward said terminal end.

7. The coupler of claim 4 including an elastomeric gasket having a gasket base portion received in said groove and having a sealing portion that is inclined in a direction toward said longitudinal axis and back toward said spline portion.

8. The coupler of claim 7 wherein said groove has a groove bottom and said gasket base portion is adhesively bonded to said groove bottom.

9. The coupler of claim 7 including a lubricant on said gasket, and a removable protective wrap covering said gasket and lubricant.

10. The coupler of claim 9 wherein said wrap provides protection against ultraviolet radiation.

11. A pipe joint between a cylindrical male coupler received in a female coupler, said male and female couplers having terminal end portions with cooperating cam surfaces that facilitate insertion of said male coupler into said female coupler, said male and female couplers having cooperating projections that cam past one another when said male coupler is inserted into said female coupler and that engage one another to inhibit longitudinal separation of said male and female couplers, a gasket on said male coupler between said male coupling terminal end portion and said male coupler projection, and said female coupler having an inner surface sealingly engaged by said gasket.

12. The joint of claim 11 wherein said male and female couplers have longitudinal axes and said male and female couplers are configured to be articulatable to skew said axes up to at least several degrees when said projections have been cammed past one another and said male coupler is received in said female coupler.

13. The joint of claim 11 wherein said male coupler has an abutment engageable by said terminal end portion of said female coupler and said female coupler has an abutment engageable by said terminal end portion of said male coupler, and said abutments being longitudinally-spaced from said projections a sufficient distance to provide clearance for relative longitudinal movement between said couplers when said projections have been completely cammed past one another and said male coupler is received in said female coupler.

14. The joint of claim 11 wherein said male and female couplers are made from extruded plastic strips having opposite strip ends, said strips being bent into a cylindrical shape and welded together at said opposite ends to provide each of said couplers with a longitudinally extending welded joint.

15. The joint of claim 11 wherein said male coupler has a cylindrical main coupler portion with a cylindrical outer surface and a male spline extending in an opposite direction from said main coupler portion, and said spline being displaced radially outward from said cylindrical outer surface.

16. The joint of claim 11 wherein said female coupler has a cylindrical main coupler portion with a cylindrical outer surface and a female coupler spline extending in an opposite direction from said main coupler portion, and said female coupler spline being displaced radially inward from said cylindrical outer surface.

17. A pipe joint between a cylindrical male coupler received in a female coupler, said male and female couplers having terminal end portions with cooperating cam surfaces that facilitate insertion of said male coupler into said female coupler, said male and female couplers having cooperating projections that cam past one another when said male coupler is inserted into said female coupler and that engage one another to inhibit longitudinal separation of said male and female couplers, said couplers and projections being configured to provide longitudinal and angular relative movement between said couplers when said projections have been completely cammed past one another and said male coupler is received in said female coupler, a gasket on said male coupler between said male coupling terminal end portion and said male coupler projection, and said female coupler having an inner surface sealingly engaged by said gasket.

18. The joint of claim 17 wherein said male and female couplers have longitudinal axes and said male and female couplers are articulatable to skew said axes up to at least several degrees.

19. A pipe joint between a cylindrical male coupler received in a female coupler, said male and female couplers having terminal end portions with cooperating cam surfaces that facilitate insertion of said male coupler into said female coupler, said male and female couplers having cooperating projections that cam past one another when said male coupler is inserted into said female coupler and that engage one another to inhibit longitudinal separation of said male and female couplers, said couplers and projections being configured to provide longitudinal and angular relative movement between said couplers when said projections have been completely cammed past one another and said male coupler is received in said female coupler, said male coupler having an abutment engageable by said terminal end portion of said female coupler and said female coupler having an abutment engageable by said terminal end portion of said male coupler, and said abutments being longitudinally spaced from said projections to provide spaces for longitudinal and angular movement of said couplers relative to one another.

20. The joint of claim 19 wherein said abutments are concavely curved.

21. A pipe joint between a cylindrical male coupler received in a female coupler, said male and female couplers having terminal end portions with cooperating cam surfaces that facilitate insertion of said male coupler into said female coupler, said male and female couplers having cooperating projections that cam past one another when said male coupler is inserted into said female coupler and that engage one another to inhibit longitudinal separation of said male and female couplers, said couplers and projections being configured to provide longitudinal and angular relative movement between said couplers when said projections have been completely cammed past one another and said male coupler is received in said female coupler, said male coupler having a cylindrical main coupler portion with a cylindrical outer surface and a male spline extending in an opposite direction from said main coupler portion, and said spline being displaced radially outward from said cylindrical outer surface.

22. A pipe joint between a cylindrical male coupler received in a female coupler, said male and female couplers having terminal end portions with cooperating cam surfaces that facilitate insertion of said male coupler into said female coupler, said male and female couplers having cooperating projections that cam past one another when said male coupler is inserted into said female coupler and that engage one another to inhibit longitudinal separation of said male and female couplers, said couplers and projections being configured to provide longitudinal and angular relative movement between said couplers when said projections have been completely cammed past one another and said male coupler is received in said female coupler, said female coupler having a cylindrical main coupler portion with a cylindrical outer surface and a female coupler spline extending in an opposite direction from said main coupler portion, and said female coupler spline being displaced radially inward from said cylindrical outer surface.

23. A pipe joint between a cylindrical male coupler received in a female coupler, said male and female couplers having terminal end portions with cooperating cam surfaces that facilitate insertion of said male coupler into said female coupler, said male and female couplers having cooperating projections that cam past one another when said male coupler is inserted into said female coupler and that engage one another to inhibit longitudinal separation of said male and female couplers, said couplers and projections being configured to provide longitudinal and angular relative movement between said couplers when said projections have been completely cammed past one another and said male coupler is received in said female coupler, a gasket on said male coupler between said male coupling terminal end portion and said male coupler projection, said female coupler having an inner surface sealingly engaged by said gasket, and said female coupler having an outer surface with an outer surface diameter that is not larger than the outer diameter of a pipe that said female coupler is attached to.

* * * * *